(12) United States Patent
Uribe et al.

(10) Patent No.: US 8,059,705 B2
(45) Date of Patent: Nov. 15, 2011

(54) CHANNEL EQUALIZATION USING FREQUENCY AND PHASE COMPENSATION

(75) Inventors: Julian Uribe, Chula Vista, CA (US); Wei Fu, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1237 days.

(21) Appl. No.: 11/707,801

(22) Filed: Feb. 16, 2007

(65) Prior Publication Data

US 2008/0198954 A1   Aug. 21, 2008

(51) Int. Cl.
*H03H 7/30* (2006.01)
*H04L 27/00* (2006.01)
*H04L 27/08* (2006.01)
*H04B 1/10* (2006.01)

(52) U.S. Cl. ........ 375/229; 375/230; 375/231; 375/232; 375/233; 375/316; 375/345; 375/346; 375/350

(58) Field of Classification Search .......... 375/229–233, 375/260, 316, 345, 350; 455/260
See application file for complete search history.

(56) References Cited

U.S. PATENT DOCUMENTS

| 5,557,640 | A  | * | 9/1996  | Chadwick ...................... 375/229 |
| 2004/0190661 | A1 | * | 9/2004  | Vrazel .......................... 375/350 |
| 2006/0057996 | A1 | * | 3/2006  | Petrovic et al. ............... 455/260 |
| 2007/0053451 | A1 | * | 3/2007  | French et al. .................. 375/260 |
| 2008/0170646 | A1 | * | 7/2008  | Sobchak et al. ............... 375/345 |
| 2008/0279318 | A1 | * | 11/2008 | Bharitkar et al. ............. 375/350 |
| 2010/0067567 | A1 | * | 3/2010  | Ghiasi .......................... 375/220 |

* cited by examiner

*Primary Examiner* — Khanh C Tran
*Assistant Examiner* — Eboni Hughes
(74) *Attorney, Agent, or Firm* — Law Office of Gerald Maliszewski; Gerald Maliszewski (57) ABSTRACT

A system and method are provided for channel equalization using a combination of frequency and phase compensation. The method receives a serial data stream input, and parallel processes the data stream input through a first and second path. The first path has a first frequency response, and the second path has a second frequency response, higher than the first frequency response. Signals are combined from the first and second paths, creating a frequency compensated signal. Then, the frequency compensated signal is parallel processed through a third path having a first time delay, and a fourth path having a fourth time delay, greater than the third time delay. The signals from the third and fourth paths are combined, created a phase compensated signal. In one aspect, the phase compensated signal is amplified, creating a voltage limited output signal.

19 Claims, 6 Drawing Sheets

Fig. 7 ably passed through an all pass linear amplifier, and the data stream input through the second path may be amplified through a high pass filter. Likewise, the combined signal is parallel processed by fixedly setting the gain through the third path, but varying (weighting) the gain through the fourth path.

CHANNEL EQUALIZATION USING FREQUENCY AND PHASE COMPENSATION

BACKGROUND OF THE INVENTION

1. Field of the Invention

This invention generally relates to digital communications and, more particularly, to a system and method for minimizing the effects of intersymbol interference in a data channel of binary coded information.

2. Description of the Related Art

Figure 1:
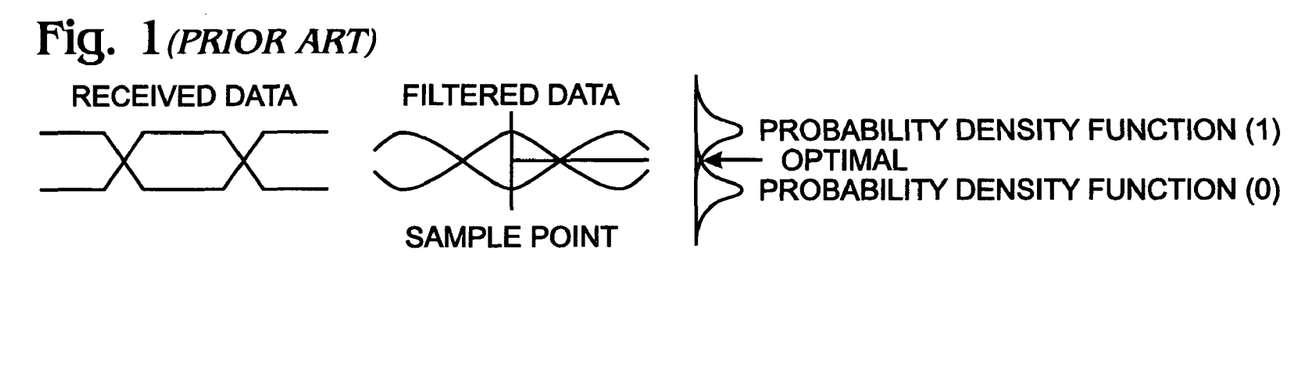
FIG. 1 is a diagram illustrating a signal recovered from a binary symmetric, non-dispersive channel in the presence of noise (prior art).

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit. As the rates of high speed serial channels become higher and higher, intersymbol interference (ISI) becomes the limiting factor for reliable data transmission.

As a function of the filtering process, and sometimes as a result of the transmission process, pulse spreading (ISI) occurs. That is, the energy associated with a bit spreads to neighboring bits. For small degrees of spreading these effects of this can be limited to the nearest neighbors with modest degradation in performance. The ISI may be caused by various non-ideal effects of the transmission channels, such as bandwidth frequency selective behavior in backplane lines (e.g., FR4), or optical dispersion in the optical fiber.

After conversion from analog to digital signals, the ISI can practically seen as associated with one of three possible pulse spreading errors. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if the high frequency components of the signal can be accurately recovered.

Figure 2:
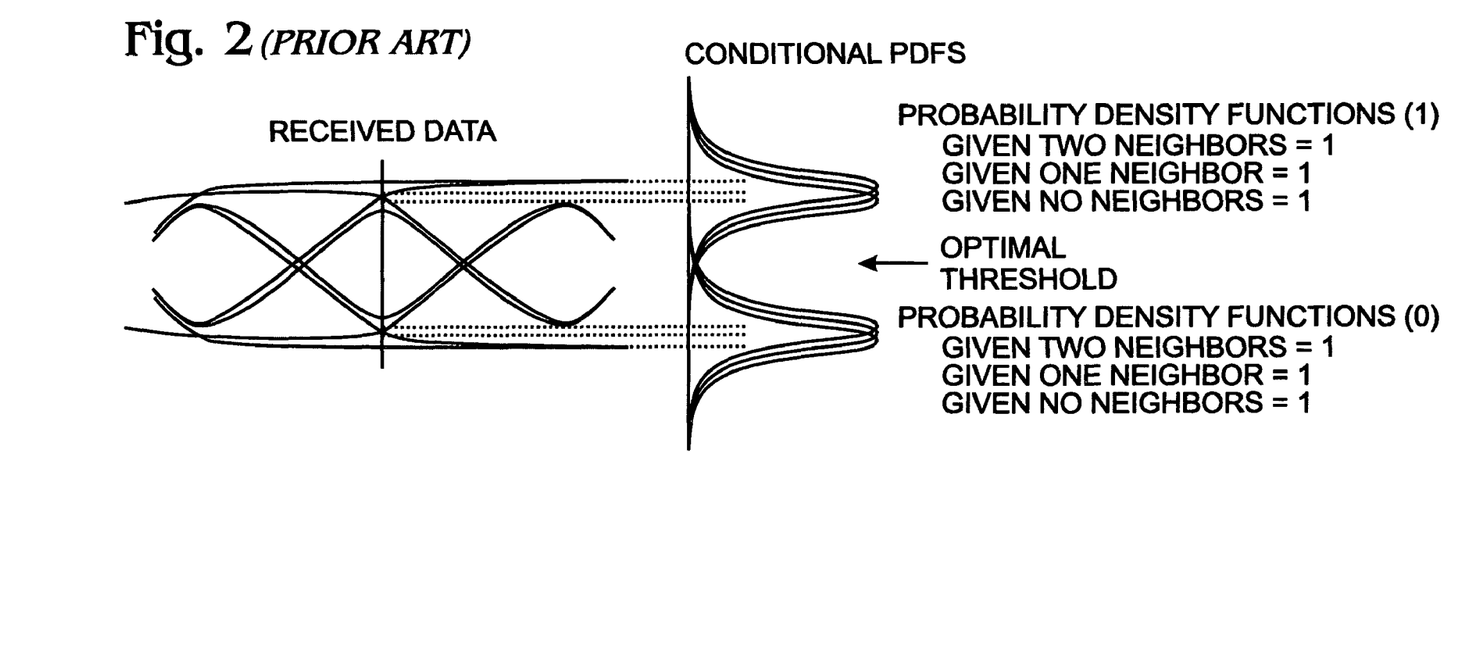
FIG. 2 is a diagram illustrating received waveforms that are distorted in response to the intersymbol interference resulting from energy dispersion (prior art).

FIG. 2 is a diagram illustrating received waveforms that are distorted in response to the intersymbol interference resulting from energy dispersion (prior art). The value at the output of the filter varies with each bit, and is essentially a random process, due to the non-deterministic nature of the information, and scrambling that is often used in the transmission of data streams. However, received bits can be characterized with probability density functions (PDFs), as shown.

Using a conditional feed-forward equalizer (FFE) with a decision feedback equalizer (DFE), bit value decisions can be made using the knowledge of the decision made on the preceding decoded bit and with a measurement of a subsequent decoded bit. Then, the corresponding probability density function can be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

Equalization is an effective method to combat the ISI and it has been used for various communication channels. The implementation of equalizers can be performed in either the digital or analog domains. Finding an efficient implementation of equalization can be especially challenging at rates greater than 10 gigabits per second (GB/s). Further, high speed CMOS circuits typically require more power, as the current for the enabling CMOS circuitry increases non-linearly at higher operating frequencies.

It would be advantageous if intersymbol interference caused by energy dispersion in a received data channel could be minimized.

It would be advantageous if an equalization process could be developed that was both simple and energy efficient.

SUMMARY OF THE INVENTION

Many communication channels exhibit temporal spreading of the signaling waveform when propagating over long distances or over non-linear media. Similar temporal spreading can occur in the cabling between circuit boards, on a circuit board, or even within an integrated circuit due to improper impedance matching. The present invention equalizer addresses these problems using three parts. The first and second parts provide high frequency boosting with different phase responses. The third part is a high gain amplifier to boost the equalized signal rail-to-rail. The purpose of having two different type phase responses of high frequency boosting is to compensate for different phase distortions in the communication channel.

The first part of the equalizer is composed of the summation of two paths with two separate weights, which are programmable based on the channel condition. The first path is an all pass linear amplifier and the second path has a high pass filter response. The combination of these two paths gives high frequency boosting. The second part of the equalizer contains a delay line and a subtractor. Similar to the first part, the second part may additionally provide high frequency boosting. However, the primary function of the second part is to provide two paths with different phase responses that are weighted and summed at the subtractor. The final high gain stages provide gain sufficient to enable the equalizer to process signals having a voltage as low as 10 millivolts (mV). Advantageously, the high frequency boosting permits the equalizer to process signals at data rates up to 11.5 GB/s, while minimizing the amount of CMOS current drawn.

Accordingly, a method is provided in a communications receiver for channel equalization using a combination of frequency and phase compensation. The method receives a serial data stream input, and parallel processes the data stream input through first and second paths. The first path has a first frequency response, and the second path has a second frequency response, higher than the first frequency response. Signals are combined from the first and second paths, creating a frequency compensated signal. Then, the frequency compensated signal is parallel processed through a third path having a first time delay, and a fourth path having a fourth time delay, greater than the third time delay. The signals from the third and fourth paths are combined, created a phase compensated signal.

In one aspect, the phase compensated signal is amplified, creating a voltage limited output signal. Typically, the phase compensated signal is amplified through the plurality of high-frequency compensated gain stages, where each gain stage or amplifier has a high pass filter response.

In another aspect, the input data stream is parallel processed by fixedly setting the gain through the first path, but varying (weighting) the gain through the second path. Further, the data stream input through a first path may be amplified with a gain stage having a uniform gain or a peak gain in the center of the passband, while the data stream input through the second path may be amplified with gain stages each having a high pass filter response with a peak gain at a frequency higher peak gain of the first path gain stage. Likewise, the frequency compensated signal is parallel processed by fixedly setting the gain through the fourth path and varying the gain through the third path.

Additional details of the above-described method and a communications receiver, with a system for channel equalization using a combination of frequency and phase compensation, are provided below.

DETAILED DESCRIPTION OF THE PREFERRED EMBODIMENTS

Figure 3:
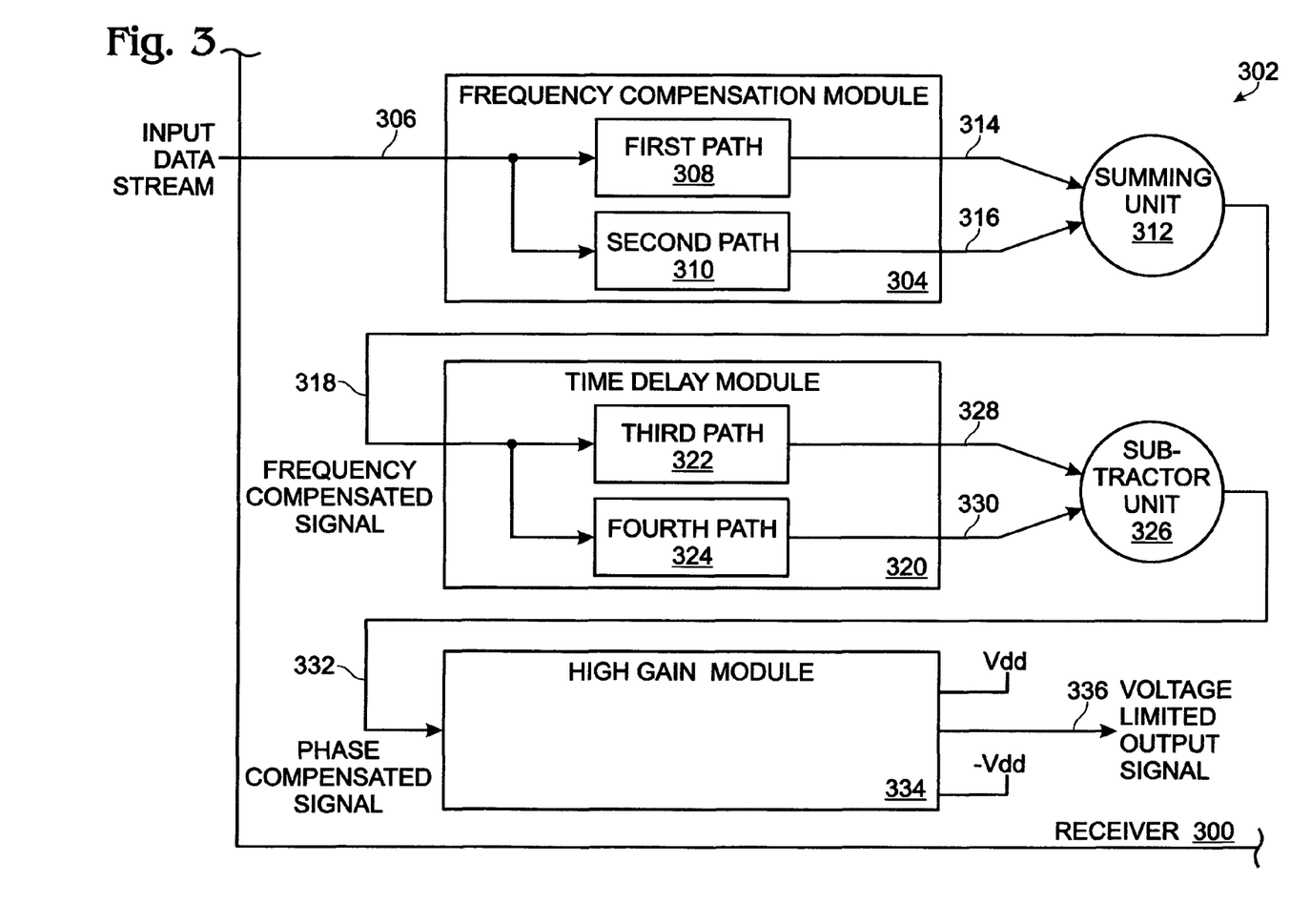
FIG. 3 is a schematic block diagram of a communications receiver, with a system for channel equalization using a combination of frequency and phase compensation.

FIG. 3 is a schematic block diagram of a communications receiver 300, with a system for channel equalization using a combination of frequency and phase compensation. The system 302 comprises a frequency compensation module 304 having an input on line 306 to receive a serial data stream input, and a first path 308 having a first frequency response for processing the data stream input. The frequency compensation module 304 also includes a parallel second path 310 having a second frequency response, higher than the first frequency response, for processing the data stream input.

Although only a single input data stream is shown, it should be understood that the present invention system is also applicable to multi-level modulation schemes such as a quadrature amplitude modulation (QAM) format. With respect to any particular input data line, the system 302 may accept a data stream binary protocol such as non-return to zero (NRZ) or return to zero (RTZ), for example. However, the present invention system is not necessarily limited to just these example protocols. Alternately, the present invention system is applicable to channel equalizing multiple lines of parallel data, such as a 32-bit data bus for example. Further, the invention is application to binary communication protocols regardless of whether the clock is recovered from the data stream, or the clock is supplied as an independent signal.

For example, the serial data on line 306 may be layer 1, Physical layer (PHY) data as described in context of the International Organization for Standardization (ISO) 7-layer reference model. For example, the receiver 102 may accept SONET, Gigabit Ethernet (GBE), Fibre Channel (FC), D1 Video, DTV, DV6000-1, HDTV, ESCON/FICON, digitally wrapped data, video, or FDDI, to name a few examples. In this aspect, the receiver 300 may be a clock recovery module that receives the input serial stream on line 306 and ultimately supplies a recovered data clock (not shown). Alternately or in addition, the receiver may convert the serial data stream to a plurality of parallel data streams or channels (not shown). However, the receiver is not necessarily limited to just these examples.

A summing unit 312 has inputs on lines 314 and 316 to accept signals from the first and second paths, respectively, and an output on line 318 to supply a frequency compensated signal created from combining signals from the first and second paths. A time delay module 320 has an input on line 318 to accept the frequency compensated signal, and includes a third path 322 having a first time delay for processing the frequency compensated signal. The time delay module 320 also includes a fourth path 324 having a fourth time delay, greater than the third time delay, for processing the frequency compensated signal on line 318. A subtraction unit 326 has inputs on lines 328 and 330 to accept signals from the third and fourth paths, respectively. The subtraction unit 326 has an output on line 332 to supply a phase compensated signal.

A high gain module 334 has an input on line 332 to accept the phase compensated signal. The high gain module 334 amplifies the phase compensated signal and supplies a voltage limited output signal on line 336. For example, the voltage limited signal provides a peak-to-peak voltage bounded by the supply voltages supplied to the high gain module 334 (e.g., +Vdd to −Vdd).

Figure 4:
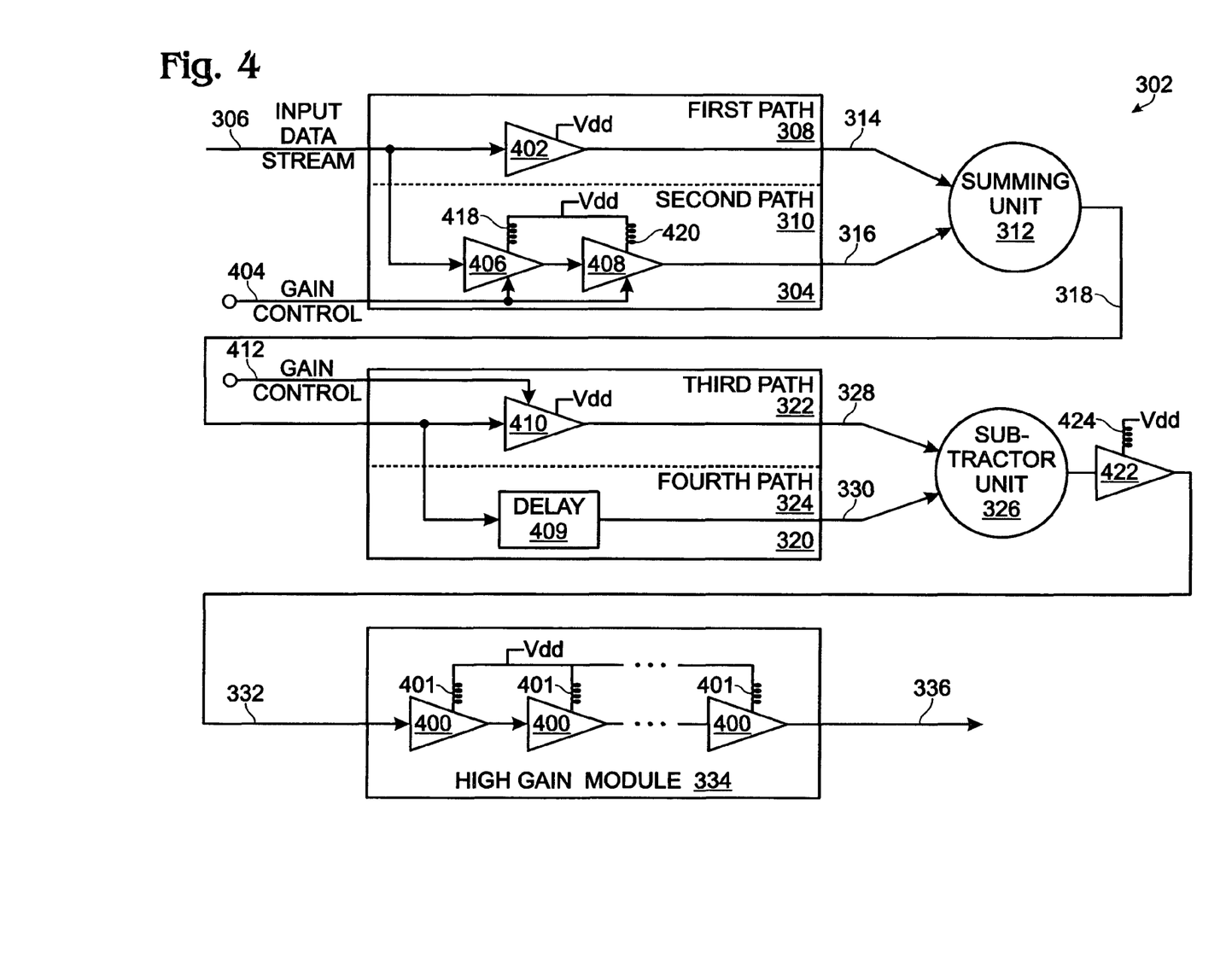
FIG. 4 is a schematic block diagram depicting a more detailed first example of the system shown in FIG. 3.

FIG. 4 is a schematic block diagram depicting a more detailed first example of the system shown in FIG. 3. In one aspect, the high gain module 334 amplifies the phase compensated signal through a plurality of high-frequency compensated gain stages. More explicitly, the high gain module 334 amplifies the phase compensated signal through a plurality of amplifiers enabled with CMOS or bipolar transistors.

Figure 5A:
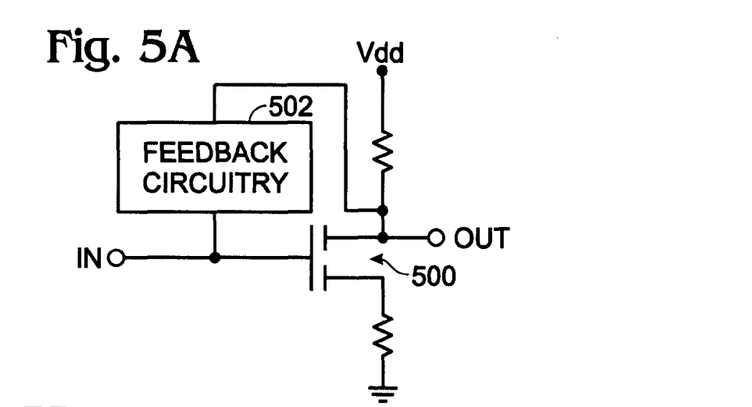
FIGS. 5A and 5B depict examples of transistor amplifiers.
Figure 5B:
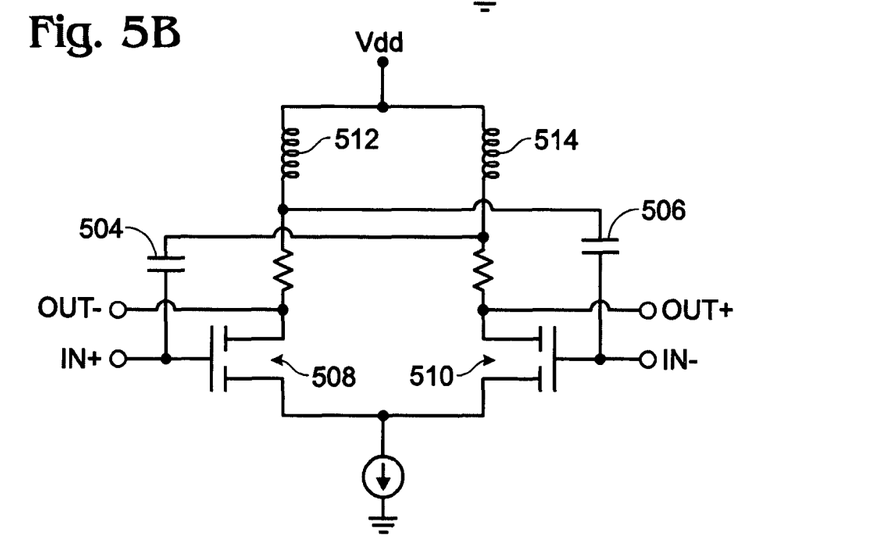

FIGS. 5A and 5B depict examples of transistor amplifiers. FIG. 5A depicts a simple voltage amplifier configured with a single transistor. The high frequency gain roll-off of transistor 500 can be minimized by biasing the amplifier to high current levels. The cutoff (unity gain) frequency of the transistor 500 is typically much higher than the amplifier itself, as the amplifier high frequency response is limited by the reactances of circuit board, loads, and any passive components or feedback circuitry 502 connected to the amplifier.

FIG. 5B depicts a differential amplifier that uses a pair of transistors 508 and 510, and a current source. The amplifier accepts a differential input signal and supplies a differential (voltage amplified) output signal. Cross-coupled capacitors 504 and 506, and inductors 512 and 514 can be selected to peak the amplifier response, giving the amplifier a high pass filter response. In FIG. 4 the transistor circuits are represented with amplifier symbols. A person with skill in the art would have the ability to design an amplifier built from one or more transistors which may amplify voltage, current, and match impedances. The present invention is not limited to any particular amplifier or filter designs.

Returning to FIG. 4, however the amplifiers 400 in the high gain module are configured, each has a high pass filter response. That is, the gain through amplifiers 400 is generally greater at higher frequencies than it is at lower frequencies. Typically, the peak gain through the amplifiers is a frequency higher than the passband center frequency. The high pass filter is represented by inductors 401. Inductor 401 typically represents several passive components.

As shown in this example, the frequency compensation module first path 308 has a fixed gain as represented by amplifier 402. That is, the gain at any particular frequency is constant. Ideally, the gain across the passband is flat, but practically the gain across the passband may roll-off at high frequencies. Ideally, peak gain through the amplifier is at about the center frequency of the passband, but practically the gain may be peaked near the lower end of the passband. The frequency compensation module second path 310 has a variable gain responsive to the gain control signals received on line 404. The gain control signals vary the gain through amplifiers 406 and 408.

In one aspect, the time delay module third path 322 has a fixed time delay. For example, the third path may be a simple transmission line. The time delay module fourth path 324 is typically a fixed time delay, but longer than the delay associated with the third path 322. Here, the additional delay is represented by delay unit 409. For example, the fourth path may be a transmission line that is longer in length than the third path transmission line. The third path, as shown, has a variable gain, while the fourth path has a fixed gain. For example, the gain through the third path 322 may be enabled with an amplifier 410. Alternately, an attenuator (not shown) could be used. The time delay module has a gain control input on line 412 to accept signals for varying the gain through the third path 322.

Figure 8:
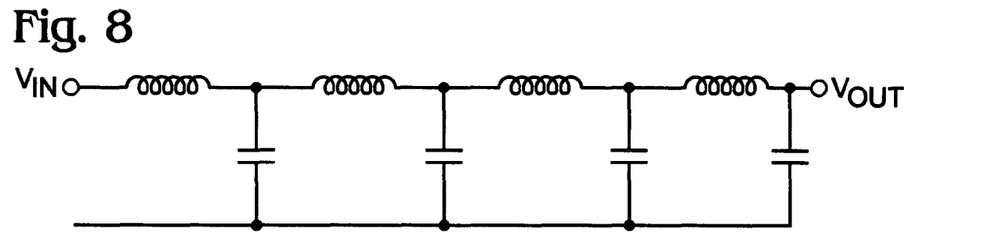
FIG. 8 is a schematic drawing of the delay unit of FIG. 4 enabled as a network of lumped element inductor and capacitor components.

FIG. 8 is a schematic drawing of the delay unit 409 of FIG. 4 enabled as a network of lumped element inductor and capacitor components.

Returning to FIG. 4, in another aspect the time delay through the fourth path 324 can be varied. Although not specifically shown, the variable time delay may be enabled by selectively switching in passive components, such as transmission lines of different lengths. Alternately, variable delay may be enabled through varying the bias as the signal is based through transistor components. There are many time and phase delay techniques known in the art that may be used to enable the delay through the fourth path.

In one aspect, the frequency compensation module first path 308 amplifies the data stream input through a first path amplifier 402 having a peak gain frequency, typically at about the center of the passband. As noted above, each amplifier mentioned herein typically includes one or more CMOS transistors, and these amplifiers are typically designed to have a frequency roll-off that is significantly lower that the cutoff frequencies of the transistors used to build the amplifiers. The frequency compensation module second path 310 amplifies the data stream input through a plurality of second path amplifiers. Here, two amplifiers 406 and 408 are shown. Amplifiers 406 and 408 each have a high pass filter response, as represented by inductors 418 and 420, with a peak gain at a frequency higher than the peak gain of the first path amplifier 402. The combination of the uncompensated signal through the first path 308 and the high frequency compensated signal through the second path 310 means that the summing unit 312, after combining the signals from the first and second paths, creates a high pass filter frequency compensated signal. Alternately stated, the gain at higher frequencies of the frequency compensated signal is greater than at the lower frequencies. It should be understood that the channel providing the input signal on line 306 typically provides a signal where higher frequencies have been attenuated. That is, the channel 306 acts as a low pass filter. Therefore, in some aspects the overall combination of the low pass-filtered input and the frequency compensated signal may be understood to act as an all pass response.

Likewise, the subtraction unit 326 (or a post-subtraction amplifier) may amplify the phase compensated signal using one or more amplifiers having a high pass filter response. Here the transistor amplifier is represented by amplifier 422 and the high pass filter is represented by inductor 424, see FIGS. 5A and 5B.

It should be noted that the additional frequency compensation provided by amplifiers 422 and 400, permits the system to maintain a constant gain across the passband subsequent to the frequency compensation module 304, while simultaneously biasing the transistors of amplifiers 410, 422, and 400 for lower power consumption.

Although not specifically shown in any of the figures, in some aspects of the system, the signal at the output of subtraction unit 326 may be analyzed to measure the ISI associated with a training (known) signal on line 306, and the gain levels of the frequency compensation and phase compensation modules may be adjusted to minimize ISI. Alternately, the ISI of communication (unknown) signals may be measured and the gain levels adjusted in real-time. In other aspects, the input data signal includes forward error correction (FEC), and the frequency compensation and phase compensation module gain levels may be adjusted to minimize the degree of FEC correction required.

Figure 6:
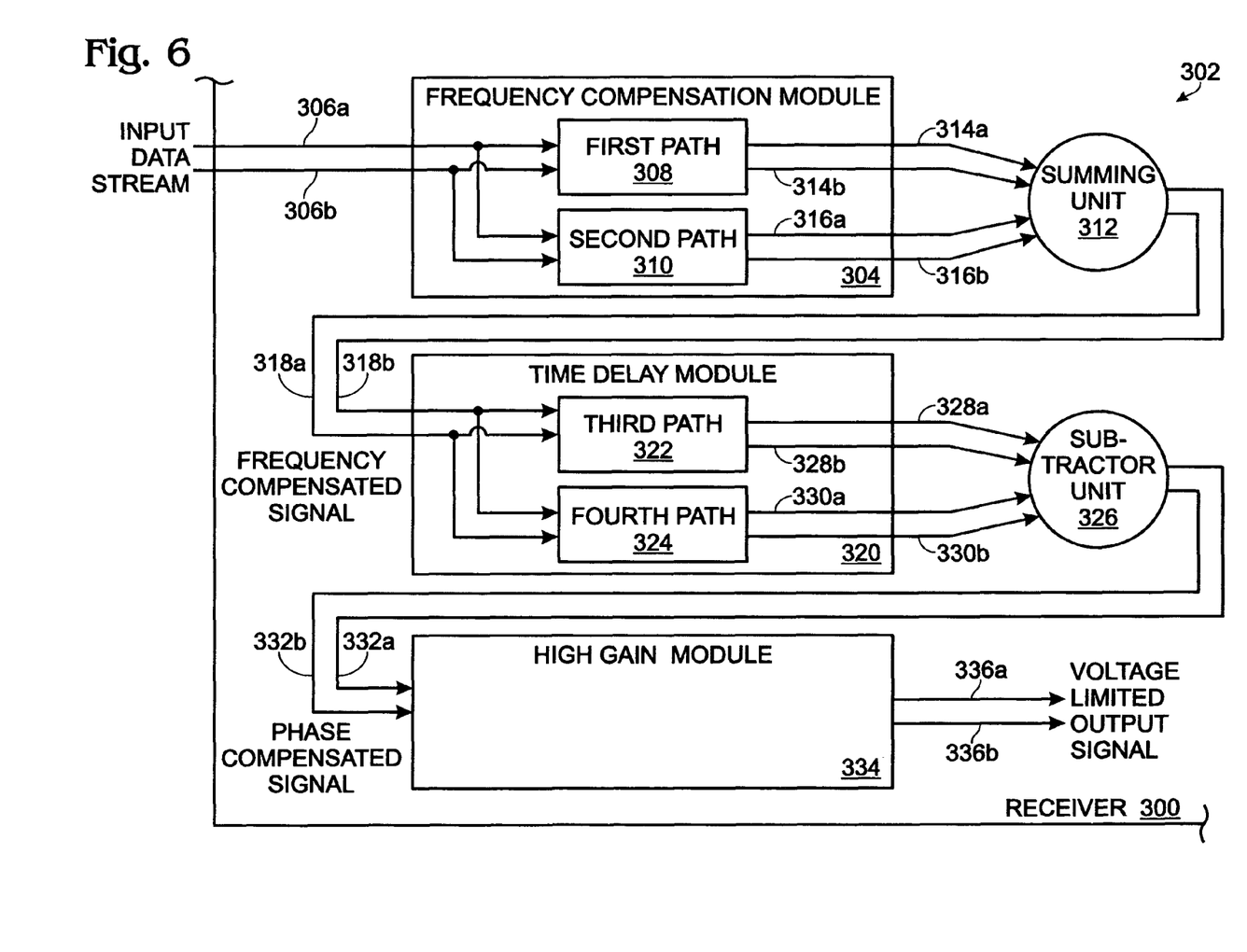
FIG. 6 is a schematic block diagram depicting a more detailed second example of the system shown in FIG. 3.

FIG. 6 is a schematic block diagram depicting a more detailed second example of the system shown in FIG. 3. The system shown in FIGS. 3 and 4 implies the use of single-ended signals, where the signal voltage is referenced to constant voltage, such as a dc voltage or ground. In this example, differential signals are used. Differential signals are 180 degrees out of phase from each other, and are understood to provide a greater degree of common-mode noise immunity. More explicitly, the frequency compensation module 304 receives a differential signal data stream input on lines 306a and 306b, the first path supplies a differential signal on lines 314a and 314b. The second path supplies a differential signal output on lines 316a and 316b.

The summing unit 312 supplies a differential frequency compensated signal on lines 318a and 318b. The time delay module third path supplies a differential signal on lines 328a and 328b, and the fourth path supplies a differential signal output on lines 320a and 320b. The subtraction unit 326 supplies a differential phase compensated signal on lines 332a and 332b, and the high gain module 334 supplies a differential voltage limited signal on lines 336a and 336b.

Functional Description

Figure 7:
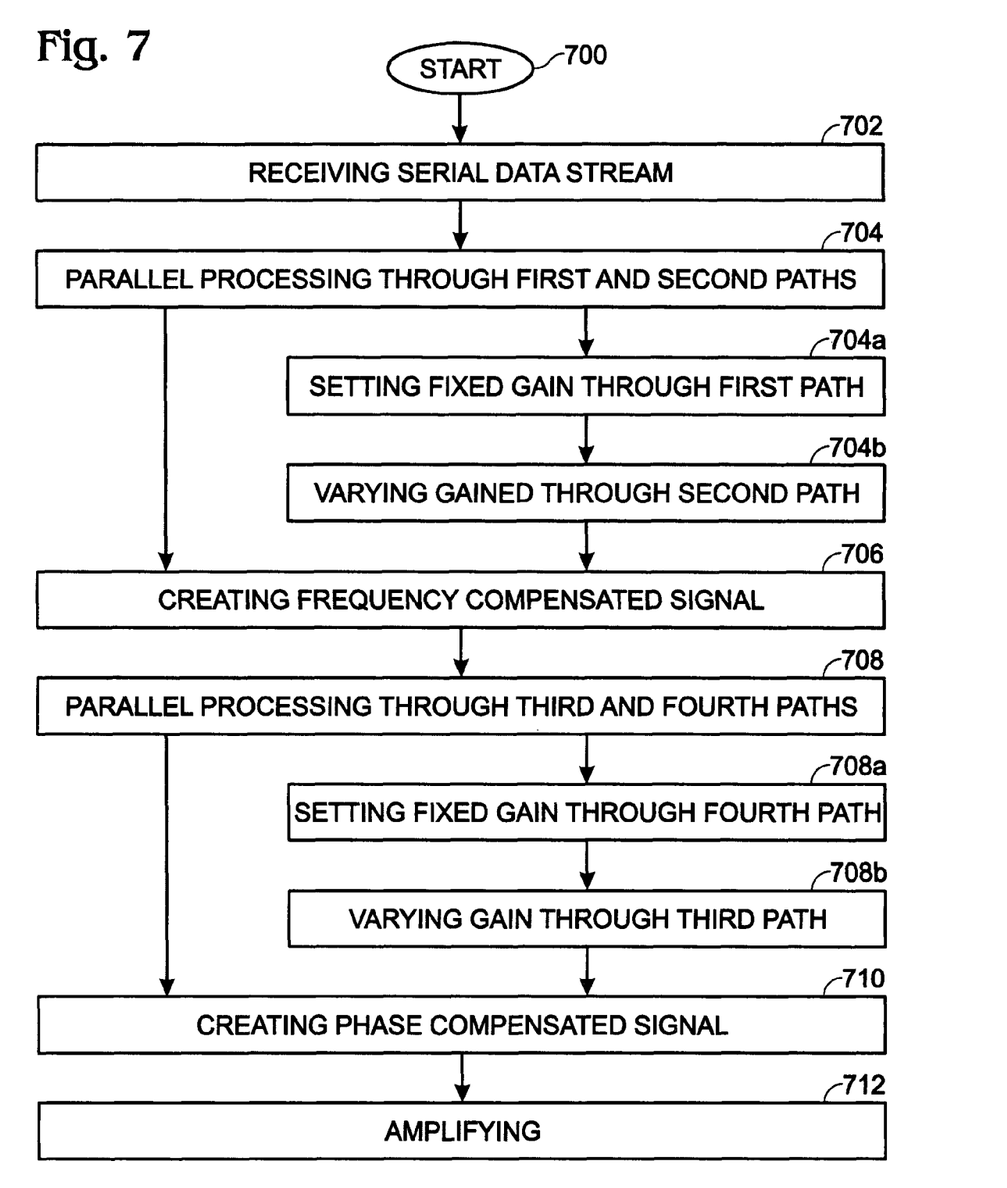
FIG. 7 is a flowchart illustrating a method for channel equalization using a combination of frequency and phase compensation in a communications receiver.

FIG. 7 is a flowchart illustrating a method for channel equalization using a combination of frequency and phase compensation in a communications receiver. The method generally corresponds to FIGS. 3, 4, 5A, 5B, and 6. Although the method is depicted as a sequence of numbered steps for clarity, no order should be necessarily inferred from the numbering. It should be understood that some of these steps may be skipped, performed in parallel, or performed without the requirement of maintaining a strict order of sequence. The method starts at Step 700.

Step 702 receives a serial data stream input. Step 704 parallel processes the data stream input through a first path having a first frequency response, and a second path having a second frequency response, higher than the first frequency response. Step 706 combines signals from the first and second paths, creating a frequency compensated signal. Step 708 parallel processes the frequency compensated signal through a third path having a first time delay, and a fourth path having a fourth time delay, greater than the third time delay. Step 710 combines the signals from the third and fourth paths, created a phase compensated signal. Step 712 amplifies the phase compensated signal, creating a voltage limited output signal.

Typically, creating the voltage limited signal in Step 712 includes amplifying the phase compensated through a plurality of high-frequency compensated gain stages. As described above in the explanation of FIGS. 4, 5A, and 5B, Step 712 may entail amplifying the phase compensated signal through a plurality of gain stages or amplifiers, each having a high pass filter response.

In one aspect, parallel processing the data stream input in Step 704 includes substeps. Step 704a fixedly sets the gain through the first path, while Step 704b varies the gain through the second path. Then, Step 706 supplies a frequency compensated signal responsive to varying the second path gain. More explicitly, Step 704a may amplify the data stream input through a first path gain stage having a peak gain frequency, typically near the center of the passband. Step 704b amplifies the data stream input through a plurality of second path gain stages, each having a high pass filter response with a peak gain at a frequency higher than the peak gain of the first path gain stage. In one variation, combining signals from the first and second paths in Step 706 includes creating a high pass filter frequency compensated signal.

In another aspect, parallel processing the frequency compensated signal in Step 708 includes substeps. Step 708a varies the gain through the third path, while Step 708b fixedly sets the gain through the fourth path. Then, Step 710 supplies a phase compensated signal responsive to varying the gain through the third path.

In a different aspect, receiving the data stream input in Step 702 includes receiving a differential signal data stream input. Step 706 combines differential signals from the first and second paths, creating a frequency compensated differential signal. Likewise, Step 710 combines differential signals from the third and fourth paths, creating a phase compensated differential signal, and Step 712 creates a voltage limited differential signal.

A system and method have been provided for channel equalization using a combination of frequency and phase compensation techniques. Specific examples of amplification and delay circuits have been given to illustrate the invention. However, the invention is not limited to merely these examples. Further, although the present invention has generally been described in the context of a single serial data input, it should be understood that the invention is equally applicable to a system that receives multiple serial lines in parallel, and decodes the channel equalized data as multi-level QAM or as a parallel data bus word. Other embodiments and variations of the invention will occur to those skilled in the art.

We claim:

1. In a communications receiver, a method for channel equalization using a combination of frequency and phase compensation, the method comprising:
    receiving a serial data stream input having a first data rate;
    parallel processing the data stream input through a first path having a first frequency response and a second path having a second frequency response, higher than the first frequency response;
    combining signals from the first and second paths, creating a frequency compensated signal having the first data rate;
    parallel processing the frequency compensated signal through a third path having a first time delay and a fourth path having a second time delay, greater than the first time delay; and,
    combining the signals from the third and fourth paths, creating a phase compensated signal having the first data rate.

2. The method of claim 1 further comprising:
    amplifying the phase compensated signal, creating a voltage limited output signal.

3. The method of claim 2 wherein creating the voltage limited signal includes amplifying the phase compensated through a plurality of high-frequency compensated gain stages.

4. The method of claim 3 wherein amplifying the phase compensated signal through the plurality of high-frequency compensated gain stages includes amplifying the phase compensated signal through a plurality of gain stages, each having a high pass filter response.

5. The method of claim 1 wherein parallel processing the data stream input includes:
    fixedly setting the gain through the first path; and,
    varying the gain through the second path; and,
    wherein creating the frequency compensated signal includes supplying a frequency compensated signal responsive to varying the second path gain.

6. The method of claim 1 wherein parallel processing the frequency compensated signal includes:
    varying the gain through the third path; and,
    fixedly setting the gain through the fourth path; and,
    wherein creating the phase compensated signal includes supplying a phase compensated responsive to varying the gain through the third path.

7. The method of claim 2 wherein receiving the data stream input includes receiving a differential signal data stream input;
    wherein combining signals from the first and second paths includes combining differential signals from the first and second paths, creating a frequency compensated differential signal;
    wherein combining the signals from the third and fourth paths includes combining differential signals from the third and fourth paths, creating a phase compensated differential signal; and,
    wherein creating the voltage limited signal includes creating a voltage limited differential signal.

8. The method of claim 1 wherein parallel processing the data stream input includes:
    amplifying the data stream input through a first path gain stage having a peak gain frequency; and,
    amplifying the data stream input through a plurality of second path gain stages, each having a high pass filter response with a peak gain frequency, higher than the first path peak gain frequency.

9. The method of claim 8 wherein combining signals from the first and second paths includes creating a high pass filter frequency compensated signal.

10. In a communications receiver, a system for channel equalization using a combination of frequency and phase compensation, the system comprising:
    a frequency compensation module having an input to receive a serial data stream input having a first data rate, a first path having a first frequency response for processing the data stream input and a parallel second path having a second frequency response, higher than the first frequency response, for processing the data stream input;
    a summing unit having inputs to accept signals from the first and second paths and an output to supply a frequency compensated signal having the first data rate, created from combining signals from the first and second paths;

a time delay module having an input to accept the frequency compensated signal, a third path having a first time delay for processing the frequency compensated signal, and a fourth path having a second time delay, greater than the first time delay, for processing the frequency compensated signal; and, a subtraction unit having inputs to accept signals from the third and fourth paths, and an output to supply a phase compensated signal having the first data rate.

11. The system of claim 10 further comprising:

a high gain module having an input to accept the phase compensated signal, the high gain module amplifying the phase compensated signal and supplying a voltage limited output signal.

12. The system of claim 11 wherein the high gain module amplifies the phase compensated through a plurality of high-frequency compensated gain stages.

13. The system of claim 12 wherein the high gain module amplifies the phase compensated signal through a plurality of amplifiers, each having a high pass filter response.

14. The system of claim 10 wherein the frequency compensation module first path has a fixed gain;

wherein the frequency compensation module second path has a variable gain; and, the frequency compensation module further comprising:

a gain control input to accept signals for varying the gain through the second path.

15. The system of claim 10 wherein the time delay module third path has a variable gain;

wherein the time delay module fourth path has a fixed gain; and, the time delay module further comprising:

a gain control input to accept signals for varying the gain through the third path.

16. The system of claim 11 wherein the frequency compensation module receives a differential signal data stream input, and the first and second paths supply differential signal outputs;

wherein the summing unit supplies a differential frequency compensated signal;

wherein the time delay module third and fourth paths supply differential signal outputs;

wherein the subtraction unit supplies a differential phase compensated signal; and, wherein the high gain module supplies a differential voltage limited signal.

17. The system of claim 10 wherein the frequency compensation module first path amplifies the data stream input through a first path amplifier having a peak gain frequency; and, wherein the frequency compensation module second path amplifies the data stream input through a plurality of second path amplifiers, each having a high pass filter response with a peak gain frequency higher than the first path amplifier peak gain frequency.

18. The system of claim 17 wherein the summing unit combines signals from the first and second paths, creating a high pass filter frequency compensated signal.

19. The system of claim 10 wherein the subtraction unit amplifies the phase compensated signal using an amplifier having a high pass filter response.

* * * * *